US005633664A

United States Patent [19]

Bayat

[11] Patent Number: 5,633,664

[45] Date of Patent: May 27, 1997

[54] METHOD OF INFLUENCING THE CONTACT ANGLE OF THE NOZZLE SURFACE OF INKJET PRINTHEADS

[75] Inventor: Behrooz Bayat, München, Germany

[73] Assignee: Eastman Kodak Company, Rochester, N.Y.

[21] Appl. No.: 380,898

[22] Filed: Jan. 30, 1995

[30] Foreign Application Priority Data

Mar. 8, 1994 [DE] Germany ........................ 44 07 839.0

[51] Int. Cl.[6] ................................ B41J 2/16; C08F 2/48

[52] U.S. Cl. ........................... 347/47; 427/487; 427/510

[58] Field of Search ....................... 347/47, 45; 427/487, 427/508, 510

[56] References Cited

U.S. PATENT DOCUMENTS

| | | | |
|---|---|---|---|
| 5,023,026 | 6/1991 | Yoshida et al. | 264/22 |
| 5,208,604 | 5/1993 | Watanabe et al. | 347/47 |
| 5,312,517 | 5/1994 | Ouki | 156/643 |

FOREIGN PATENT DOCUMENTS

| | | | |
|---|---|---|---|
| 0 367 438 A1 | 5/1990 | European Pat. Off. | C08J 7/04 |
| 0 468 712 A2 | 1/1992 | European Pat. Off. | B41J 2/16 |
| 42 10 160 A1 | 9/1993 | Germany | B05C 1/02 |
| 4-176656 | 6/1992 | Japan | B41J 2/135 |
| 4-211959 | 8/1992 | Japan | B41J 2/05 |
| 4-235048 | 8/1992 | Japan | B41J 2/135 |
| 5-124207 | 5/1993 | Japan | B41J 2/16 |
| 5-330063 | 12/1993 | Japan | B41J 2/135 |
| WO90/14958 | 12/1990 | WIPO | B41J 2/16 |

*Primary Examiner*—Valerie Lund
*Attorney, Agent, or Firm*—Milton S. Sales

[57] ABSTRACT

Molded inkjet modules having still closed nozzles are coated with a polymer solution, preferably a PEEK solution. By means of Eximer laser radiation of a definite wavelength the nozzle ports extending through the PEEK layer and the layer of channel formation material (14 and 16) are formed by application of the laser ablation mask process. Then the surface of the PEEK layer is irradiated with a considerably reduced laser intensity (11) using the same wavelength as in the ablation process. The desired contact angle can be set in response to the irradiation.

7 Claims, 3 Drawing Sheets

METHOD OF INFLUENCING THE CONTACT ANGLE OF THE NOZZLE SURFACE OF INKJET PRINTHEADS

BACKGROUND OF THE INVENTION

1. Technical Field

The invention relates to a method of influencing the contact angle of the planar surface of an object, in particular the nozzle surface of an inkjet printhead, in which method the nozzle surface of the printhead is provided with a polymer layer.

2. Background Art

DE-A-42 10 160 discloses a method and apparatus for applying a hydrophobizing agent, said method preventing penetration of the hydrophobizing agent into the openings to be kept free. A coating tool consisting of a resilient member having a capillary system is moved across the surface of the object to be treated. A leading contact surface of the resilient member thereby seals the openings. Downstream of the contact surface, the dissolved hydrophobizing agent is applied to the part to be treated in that it is supplied to its surface via the capillary system of the resilient member. The ink channels are additionally subjected to an inert gas atmosphere in order to prevent the hydrophobizing agent from contacting said channels.

WO 90/14958 proposes a hydrophobizing agent and a different method of application, in particular for inkjet printheads. As an effective component, the hydrophobizing agent comprises a silane, an at least partially fluorinized organic group thereof being bonded to the silicon by means of a saturated residue. In a vacuum chamber, the hydrophobizing agent is vapor-deposited on an inkjet printhead. For this reason, a certain amount, of the hydrophobizing agent is evaporated and deposited on the nozzle surface of the inkjet printhead. Penetration of the hydrophobizing agent into the ink channels is prevented by flowing an inert gas therethrough. The inkjet printhead thus provided with the vapor-deposit is then subjected to a temperature treatment in which individual molecules of the hydrophobizing agent are bonded to and partly cross-linked with the materials of the inkjet printhead surface.

In the two above-mentioned methods of hydrophobizing additional measures such as flushing the ink channels with inert gas, filling the channels with mercury etc., have to be taken so as to prevent the ink channels from being penetrated by the hydrophobizing agent. This is extremely important as the ink channels are hydrophilic by nature in order that the flow of the water-based ink is facilitated. Areas or islands in the interior of the ink channels having hydrophobic properties would adversely affect the ink supply rate to the nozzle ports. Moreover, adhesion of the hydrophobizing layers may suffer under the action of ink.

DISCLOSURE OF THE INVENTION

It is the object of the present invention to provide a method of influencing the contact angle of the nozzle surface of inkjet printheads without affecting the interior surfaces of the ink channels. The above object is attained in that a high temperature resistant polymer solution is applied to a nozzle surface covered with a layer of channel formation material. Subsequently, the covered nozzle ports are opened by means of laser ablation according to the mask process. Finally, the surface of the polymer layer is modified by UV laser light such that the contact angle can be set between 0° and 130°.

The advantages of the method according to the invention are to be seen in that during application of the polymer layer used for setting the contact angle the nozzle ports of the inkjet printhead are still closed by the channel formation material. Thus, no additional precautions are necessary to prevent the polymer solution from entering the ink channels.

Moreover, the wettability of the surface of the polymer layer can specifically be influenced in the method according to the invention. The same polymer material is used for a wide range of wettability.

Other advantageous aspects of the invention will be apparent from the subclaims.

BRIEF DESCRIPTIONS OF THE DRAWINGS

The invention will now be described with reference to an embodiment shown in the drawings in which.

BEST MODE FOR CARRYING OUT THE INVENTION

Figure 1:
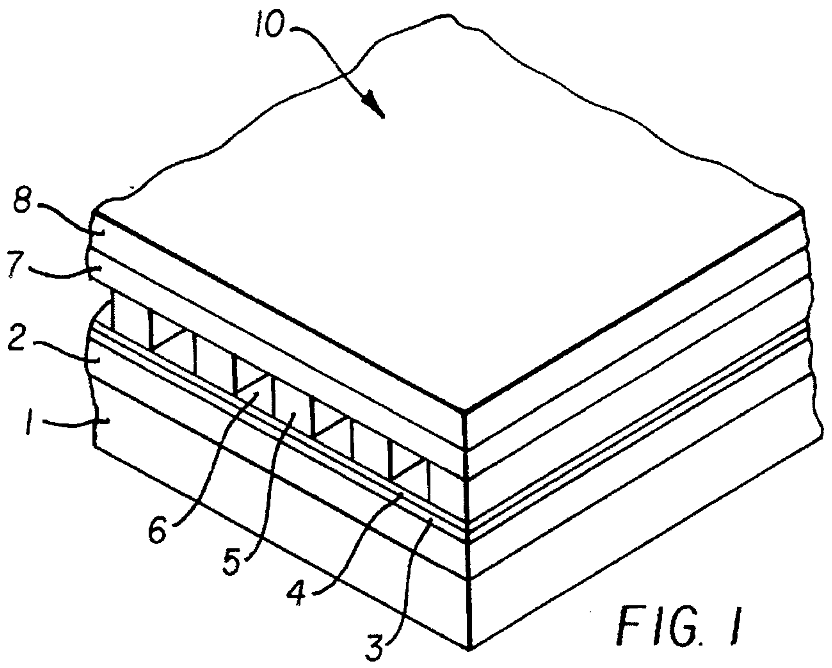
FIG. 1 shows a perspective view of an inkjet printhead structure according to the state of the art.

As shown for example in FIG. 1, an inkjet printhead 10 can be manufactured as a thin film structure. On a small metal plate 1, e.g. made of aluminum, a silicon wafer is adhered as a substrate 2 on which an insulating and a cover layer 3 and 4 are placed between which electrical conductors and resistance heating elements (not illustrated) are embedded which during operation of such inkjet printhead effect and control ejection of the ink droplets. Ink channels 6 are coated with a photo-resist layer 5, for example. For forming the ink channels, a photosensitive polymer is used. The photopolymer has proven particularly advantageous. It can be obtained under the trademark "VACREL" (No. 1 013 245) from E. I. Dupont de Nemours and Co. A glassplate 8 adhered by means of a photo-resist layer 7 defines the upper limitation of the ink channels 6.

Figure 2:
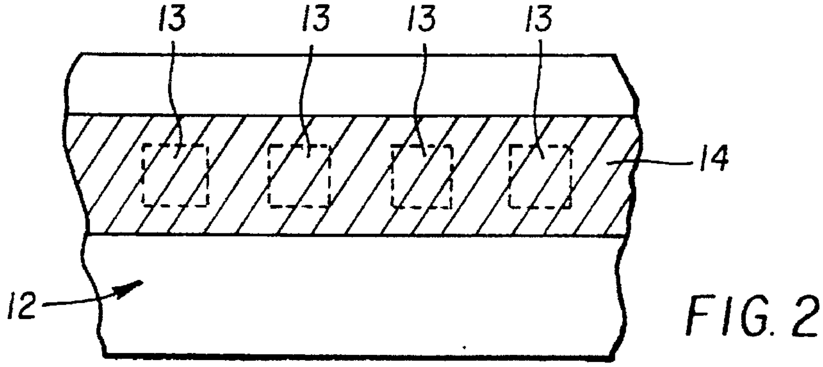
FIG. 2 is a top view of the nozzle surface.

The plurality of inkjet printheads produced on the wafer is separated such that nozzle ports 13 remain covered with the photo-resist layer used for the ink channel formation material. In the following, the photo-resist used for the channel formation is designated channel formation material. FIG. 2 is top view of nozzle surface 12 of the inkjet printhead which is covered with a layer 14 of channel formation material. The dotted squares represent nozzle ports 13 which, as mentioned above, are still closed by the channel formation material in this stage of the process.

Figure 3:
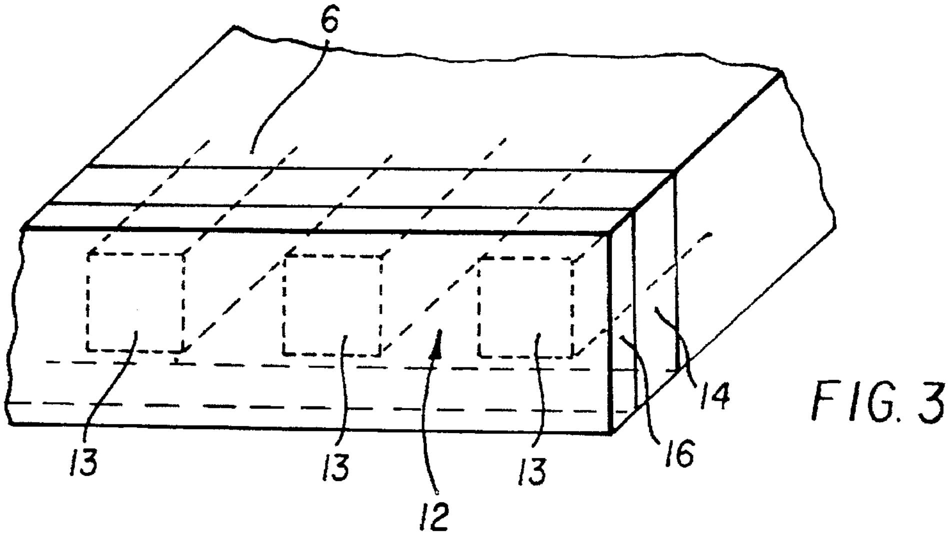
FIG. 3 shows a perspective view of part of the nozzle surface of an inkjet printhead after having been coated with the high temperature resistant polymer.

FIG. 3 shows a perspective view of part of the inkjet printhead after the high temperature resistant polymer has been coated onto layer 14 of channel formation material. The high temperature resistant polymer is taken from the class of the poly (ether-ketones). Without risking oxidization or loss or change of material properties, such polymers can be used at temperatures exceeding 200° C. Furthermore, they are insoluble in most solvents at room temperature. At higher temperatures, such polymers are soluble in benzophenone, α-chloro naphthalene or a mixture of phenol and trichlorobenzene when present in a concentration of between 0.001 and 0.1%. An additional feature of said polymers is that their surface properties (with reference to their wettability with water-based liquids) can be influenced in the UV region by means of laser irradiation. As a solution, the polymer is coated on nozzle surface 12 covered with channel formation material. This forms a further polymer layer 16 which completely covers nozzle surface 12. Poly (aryl-ether-ether-ketone)(PEEK) is preferably used. For the purpose of being coated onto layer 14 of channel formation material, PEEK is solved, for example, in the solvents mentioned above.

Figure 4:
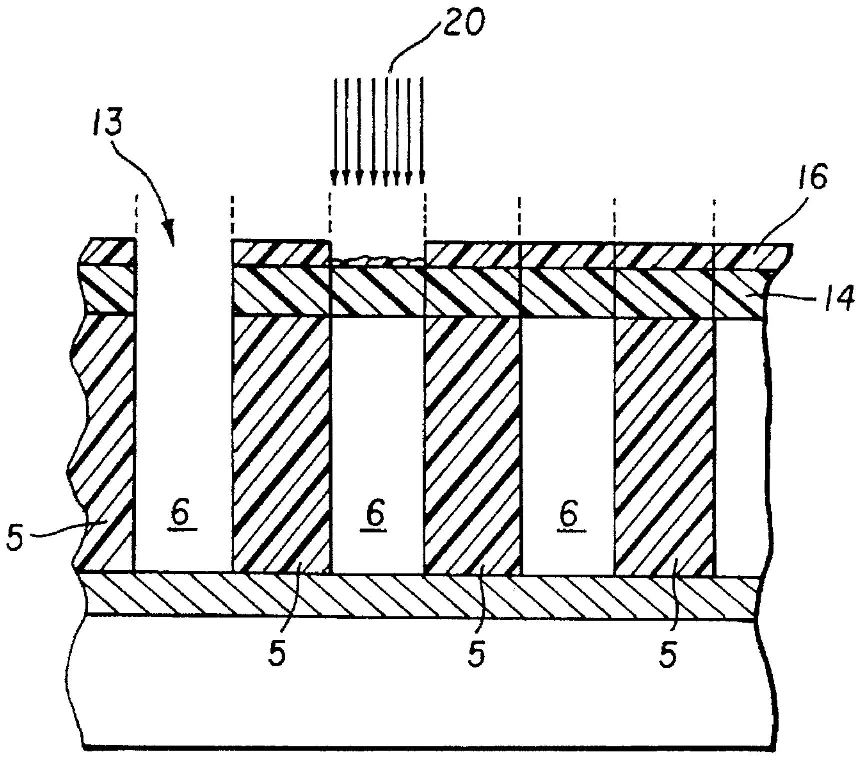
FIG. 4 shows a partial cross-section of the inkjet printhead, with a nozzle port having already been opened and another being opened by laser ablation.
Figure 5:
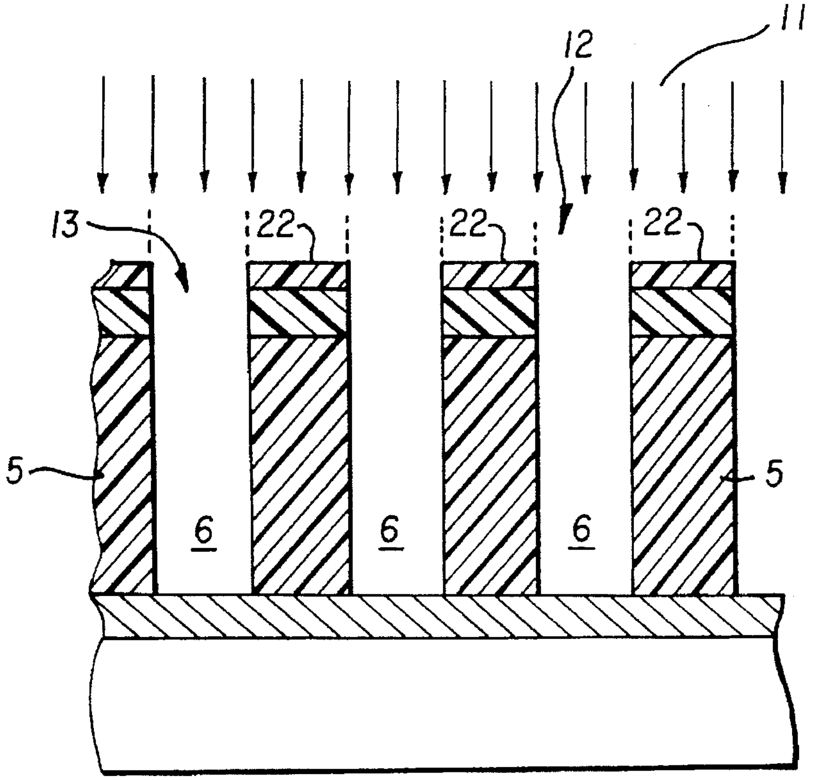
FIG. 5 is a partial cross-section of the inkjet printhead with its nozzles having already been opened, the entire nozzle surface being irradiated by laser emission to set the appropriate contact angle.

FIG. 4 shows a partial cross-section of the inkjet printhead in which part of nozzle ports 13 have already been opened by laser ablation according to the mask process. During laser ablation, both PEEK layer 16 and layer 14 of channel formation material are removed. For the laser ablation process, preferably an Eximer laser is used emitting light 20 having a wavelength of 248 nm. While the method according to the invention uses a definite electro-magnetic wavelength, the same results may also be achieved with laser radiation of different wavelengths.

Figure 6:
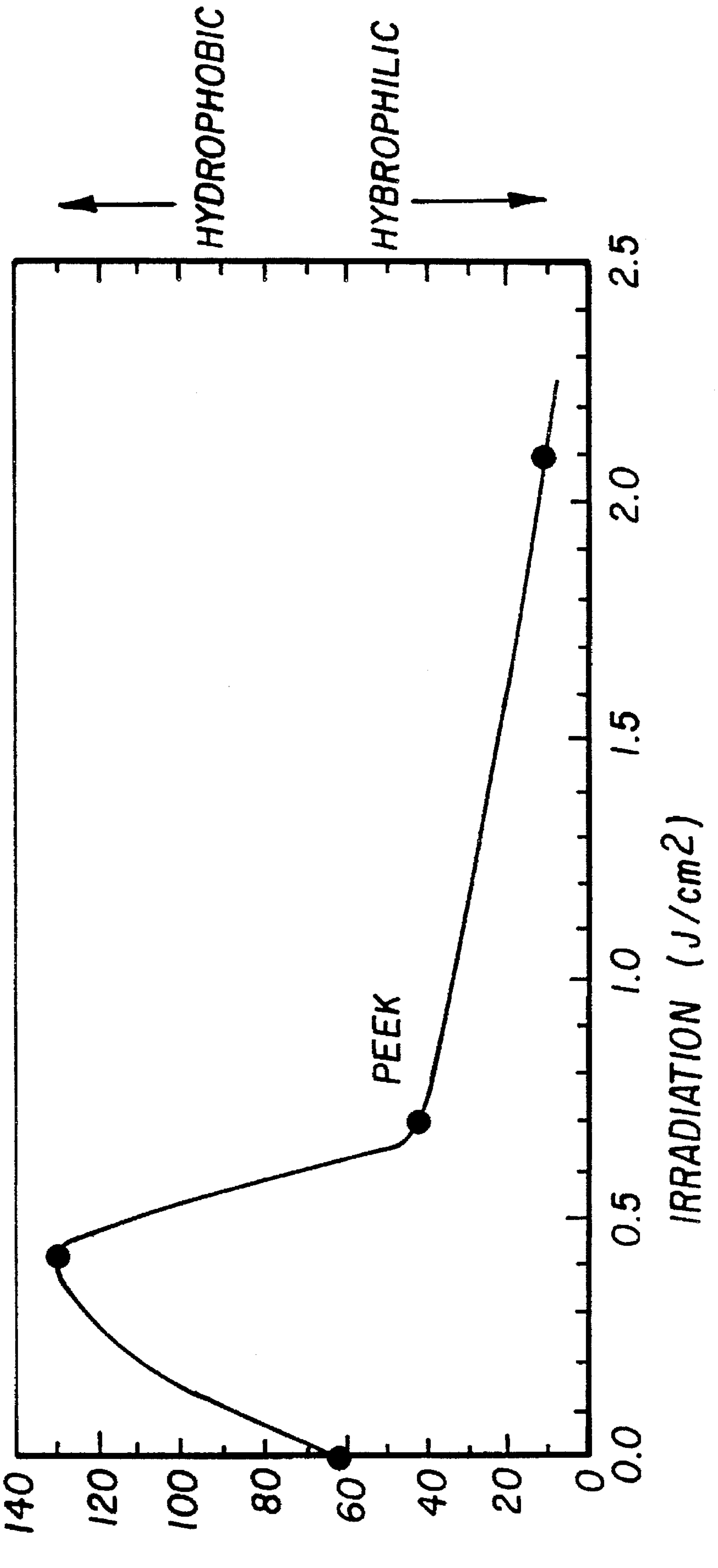
FIG. 6 shows a graph of the contact angle as a function of the irradiation.

When nozzles 13 have been opened, entire nozzle surface 12 is irradiated with a considerably reduced laser intensity 11. Reduced irradiation is achieved in a simple manner expanding the laser beam, using the same wavelength as in laser ablation. The radiation acting on the PEEK layer during this process step leads to a modification of surface 22 of this layer. The modification of the surface chiefly relates to the elimination of the hydrocarbon contamination. Resulting therefrom is a chemically activated or deactivated surface of the polymer. As shown in FIG. 6, the degree of wettability of surface 22 can be determined when an Eximer laser is used. Depending on the intensity of irradiation, surface 22 can be made hydrophobic or hydrophilic. When irradiated between 0.2 and 0.5 $J/cm^2$, a contact angle on the irradiated PEEK surface can be set ranging between >90° and <130°. The resulting surface is thus hydrophobic. If irradiation is >0.5 $J/cm^2$, but still so small that no further ablation of surface 22 of nozzle surface 12 takes place, contact angles <90° may be achieved. The resulting surface is thus hydrophilic.

The invention has been described in detail with particular reference to preferred embodiments thereof, but it will be understood that variations and modifications can be effected within the spirit and scope of the invention as set forth in the claims.

What is claimed is:

1. A method of influencing a contact angle of a planar nozzle of an inkjet printhead wherein the nozzle surface is provided with a polymer layer; said method comprising the sequential steps of:

covering the nozzle surface with a layer of channel formation material;

applying a high temperature resistant polymer solution to the nozzle surface to form a polymer layer;

opening nozzle ports in the polymer layer by means of a laser ablation mask process; and modifying the polymer layer by UV laser light such that the contact angle is set between 0° and 130°.

2. A method as set forth in claim 1 wherein the steps of opening the nozzle ports and modifying the polymer layer are performed by means of laser emission of an Eximer laser.

3. A method as set forth in claim 2 wherein the steps of opening the nozzle ports and modifying the polymer layer are performed using the same laser wavelength.

4. A method as set forth in claim 3 wherein the steps of opening the nozzle ports and modifying the polymer layer are performed using a laser wavelength of 248 nm.

5. A method as set forth in claim 1 wherein the step of modifying the polymer layer is performed by means of laser emission of between 0.2 $J/cm^2$ and 0.5 $J/cm^2$, whereby the surface becomes hydrophobic and the contact angle is larger than 90°.

6. A method as set forth in claim 1 wherein the step of modifying the polymer layer is performed by means of laser emission of greater than 0.5 $J/cm^2$, whereby the surface becomes hydrophobic and the contact angle is smaller than 90°.

7. A method as set forth in claim 1 wherein the step of modifying the polymer layer is performed by means of laser emission of between 0.2 $J/cm^2$ and 0.5 $J/cm^2$, whereby the high temperature resistant polymer solution is poly(aryl-ether-ether-Ketone) (PEEK).

* * * * *

UNITED STATES PATENT AND TRADEMARK OFFICE

CERTIFICATE OF CORRECTION

PATENT NO. : 5,633,664
DATED : 27 May 1997
INVENTOR(S) : Behrooz Bayat

It is certified that error appears in the above-indentified patent and that said Letters Patent is hereby corrected as shown below:

ON THE TITLE PAGE:

Item [30] should read --

[30] Foreign Application Priority Data Mar. 9, 1994 --

Signed and Sealed this

Twenty-eighth Day of October, 1997

Attest:

BRUCE LEHMAN

Attesting Officer

*Commissioner of Patents and Trademarks*